July 25, 1967
T. E. LOHR ETAL
3,332,169
WINDOW REGULATOR MECHANISM FOR RETRACTABLE
BACK WINDOWS OF VEHICLE BODIES
Filed Nov. 6, 1964
3 Sheets-Sheet 2
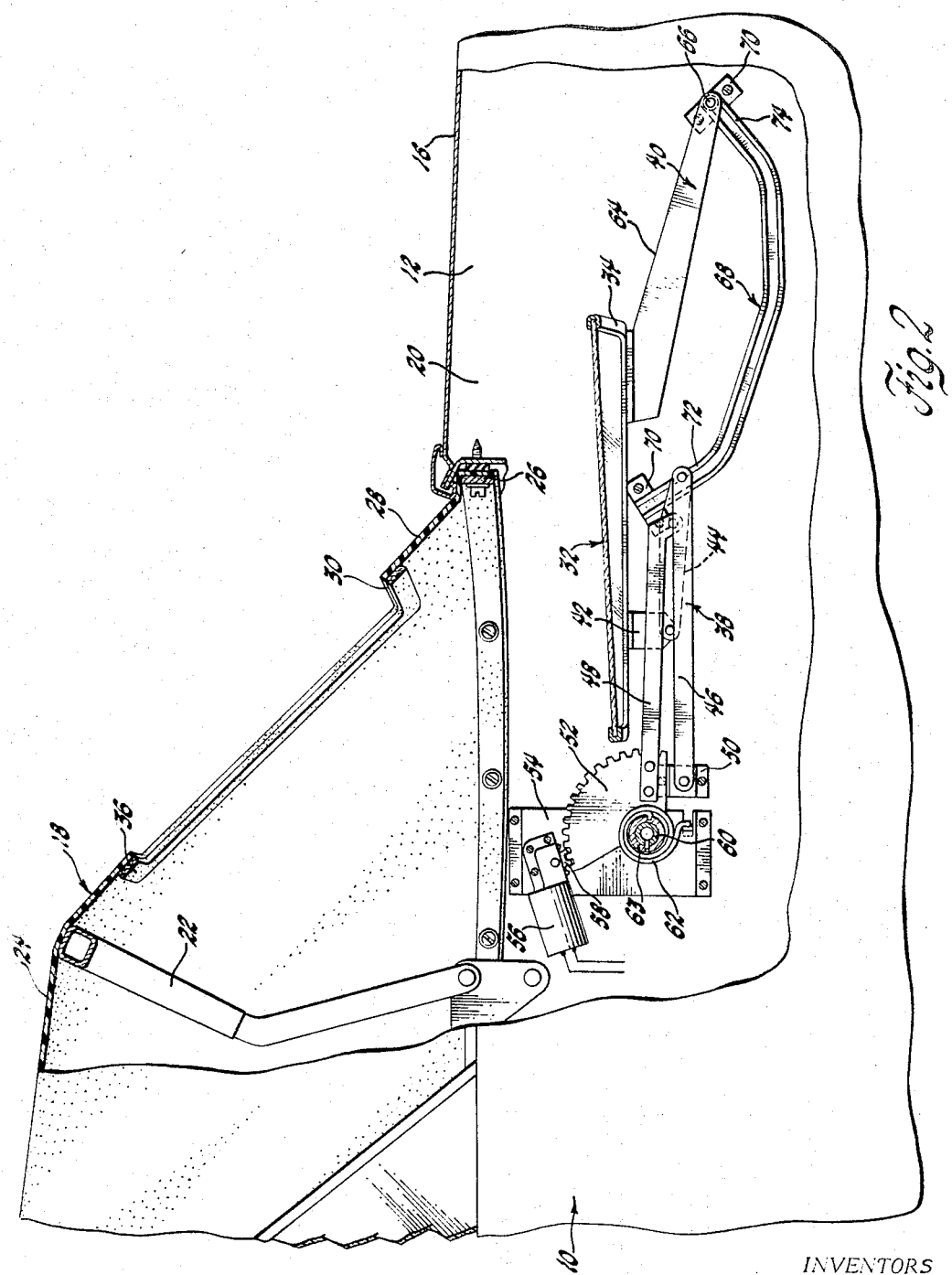
INVENTORS
Thomas E. Lohr &
BY  Bernt E. Meland
W. S. Pettigrew
ATTORNEY

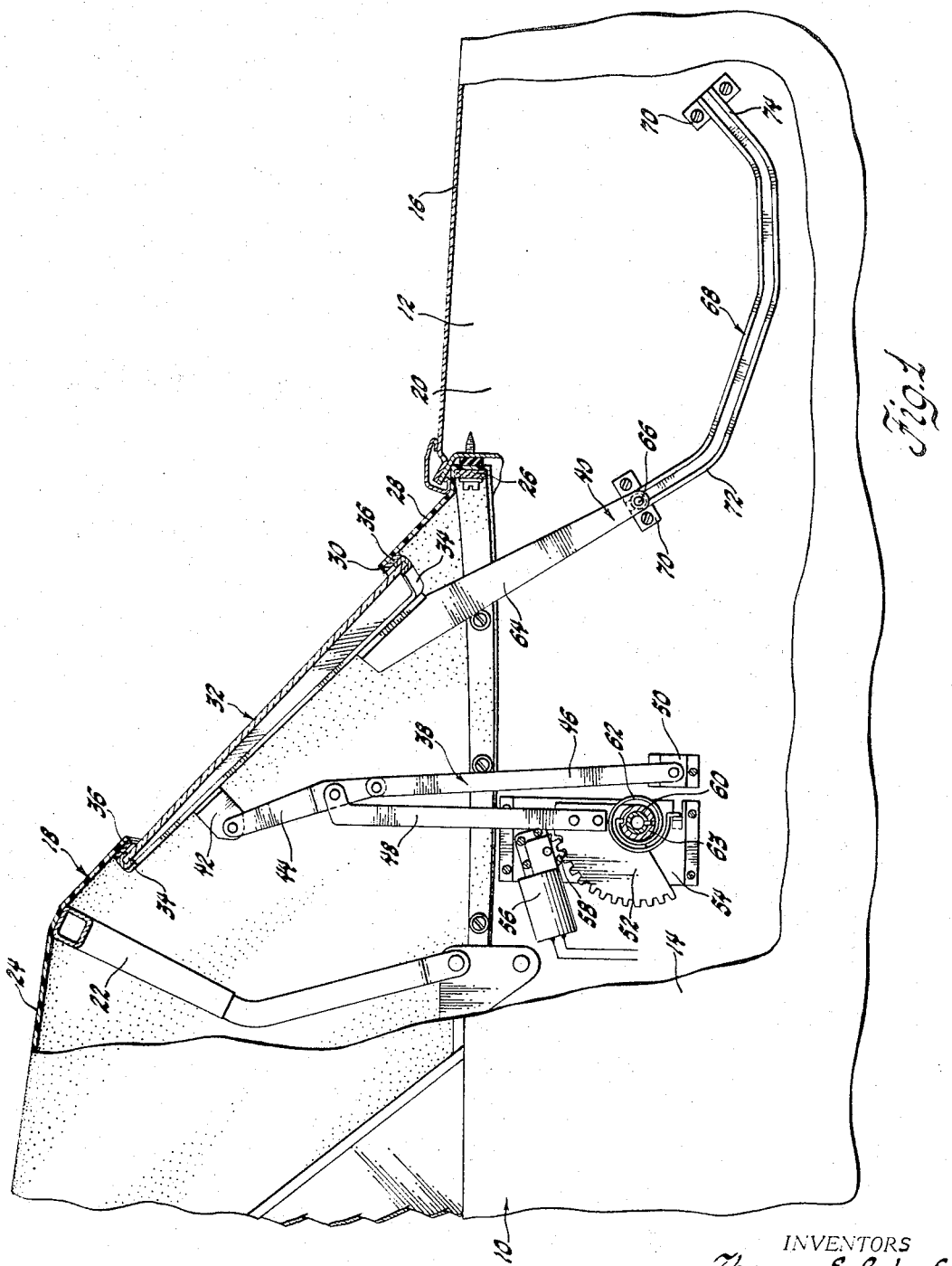

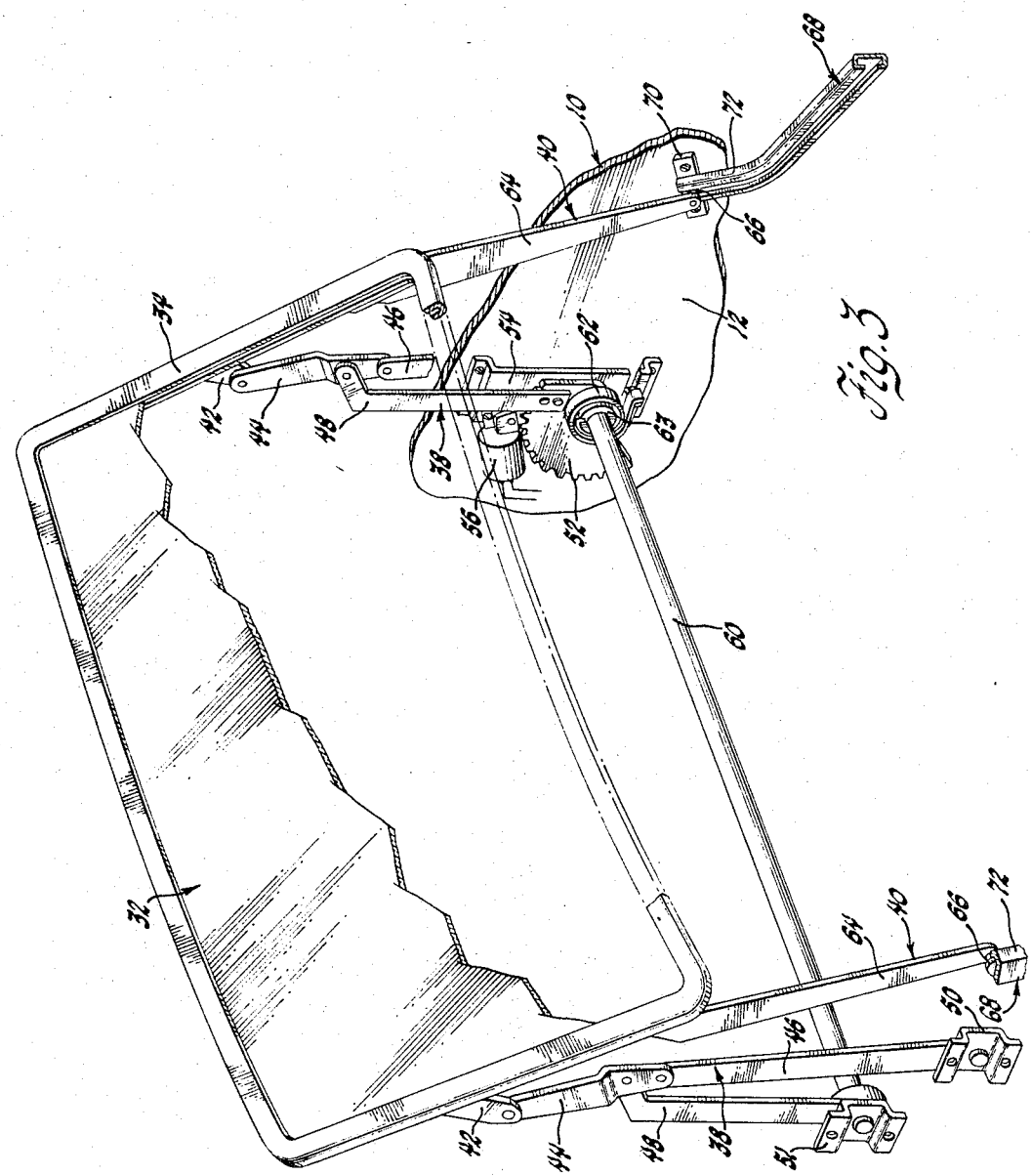

United States Patent Office 3,332,169
Patented July 25, 1967

3,332,169
WINDOW REGULATOR MECHANISM FOR RETRACTABLE BACK WINDOWS OF VEHICLE BODIES
Thomas E. Lohr, Detroit, and Bernt E. Meland, Southfield, Mich., assignors to General Motors Corporation, Detroit, Mich., a corporation of Delaware
Filed Nov. 6, 1964, Ser. No. 409,512
2 Claims. (Cl. 49—249)

This invention relates generally to vehicle body window regulator mechanisms and more particularly to regulator mechanisms for retractable back windows or backlites of vehicle bodies.

The type of vehicle body retractable back window for which the regulator mechanism of the present invention is contemplated is generally characterized by requirements that the window not only move generally vertically relative to the back window opening between open and closed positions, but that it also change inclination or attitude during such movement. This attitude change is required so that the window may be reoriented from whatever attitude it assumes in its closed position into a generally horizontal attitude nested compactly within the body adjacent the floor pan thereof when in its lowered or opened position, thus to conserve on the space consumed by the window in the body. These requirements are further complicated by the requirement that when, as is most frequently the case, such a retractable window is applied in a convertible vehicle body, the window must be supported for movement by structure other than that of the roof. Prior regulator mechanisms have largely either failed to satisfactorily meet these requirements or have been so complicated and expensive as to prohibit their general use. By this invention, however, there is provided a retractable back window regulator mechanism which fully meets the specified motion and structural requirements, but is yet of relatively simple and inexpensive construction.

One feature of this invention is that it provides a new and improved vehicle body back window regulator mechanism. Another feature of this invention is that it provides a relatively simple and inexpensive regulator mechanism for a retractable back window of a vehicle body and operable to move the window between a lowered generally horizontal position nested compactly within the body and a raised generally vertical position in tight sealing engagement with the body roof structure.

These and other features and advantages of the invention will be readily apparent from the following specification and drawings wherein:

FIGURE 1 is a fragmentary partlially broken away view of a convertible vehicle body including a back window regulator mechanism according to this invention and showing the back window in raised position;

FIGURE 2 is a view similar to FIGURE 1 showing the back window in a lowered position; and FIGURE 3 is a fragmentary partially broken away perspective view of the regulator mechanism of this invention.

Referring now particularly to FIGURE 1 of the drawings, there is show a rear quarter area of a convertible vehicle body designated generally as 10, the body including a rear quarter portion 12, an opposite rear quarter portion 14 and a deck 16. A folding top 18 is mounted on the body 10 for movement between a raised position shown in FIGURE 1, and a lowered position, not shown, retracted within a folding top well 20 of the body. Folding top 18 conventionally includes a foldable frame, a plurality of transverse bows including a rear bow 22 as shown, and a flexible top fabric cover 24 attached to the bows and the frame. Cover 24 is further attached at its rearward terminal edge to the deck 16 by a tacking strip 26, and in its rearmost portion 28, the cover is provided with a cutout 30 of a size permitting maximum observation rearwardly of the body 10. A back window closure 32 made of thin rigid glass or other suitable material, and preferably framed by a metal channel 34, is provided to close the cutout 30.

Window 32 is adapted for movement between a raised position in tight sealing engagement with fabric portion 28 and closing cutout 30 as shown in FIGURE 1, and a lowered position nested compactly within well 20, as shown in FIGURE 2. The sealing contact between closure 32 in the raised position thereof and fabric portion 28 may be effected in any desired manner, but in the embodiment shown, a flat sealing strip 36 of elastomeric, fibrous or other suitable material, is mounted on fabric portion 28 on the inner side thereof around the cutout 30, and as shown in FIGURE 1, the frame 34 is adapted in the raised position of the closure to rest flush against strip 36 in tight sealing engagement therewith.

Referring to FIGURE 3, a regulator mechanism according to this invention for moving closure 32 between raised and lowered positions generally includes a pair of power-operated regulator linkages or moving means 38 and a pair of guide assemblies 40. The linkages 38 are adapted generally to move closure 32 in directions both vertically and longitudinally of the body between raised and lowered positions, but depending upon the location of the rear seat back or other adjacent body structure, and the distance between the forward edge of deck 16 and rear seat back, the longitudinal motion requirement for the closure may be varied as desired from that shown in FIGURES 1 and 2.

In the embodiment shown, each linkage 38 includes an L-shaped bracket 42 having one leg thereof welded or otherwise suitably secured to a respective opposite side edge portion of frame 34, a motion link 44 pivotally connected adjacent its upper end to bracket 42 and having pivotally connected thereto the upper end of each of an idler link 46, and a regulator link 48, the lower end of each link 46 being rotatably mounted on a body bracket 50. The lower end of the link 48 at the quarter 14 side of body 10 is rotatably mounted on a body bracket 51, and the lower end of the link 48 adjacent quarter 12 is rigidly mounted by a pair of bolts on a sector 52 rotatably mounted on a body bracket 54. Power-operated means for moving the linkages 38 includes a small reversible electric motor and gear-reduction unit 56 suitably mounted on bracket 54 and a motor-driven pinion 58 in meshing engagement with sector 52. Sector 52 and the link 48 adjacent quarter 14 are rigidly connected at their pivots by a torque tube 60 for coordinated movement in response to operation of motor 56, and a counterbalance spring 62 is secured at one end thereof to a collar 63 rigid with sector 52 and is restrained at its other end by a bent-out tab of bracket 54. Spring 62 is wound up upon clockwise movement of sector 52 and serves to counter balance the linkages 38 in the raised position of closure 32.

Each guide assembly 40 includes an elongated guide member 64 welded or otherwise suitably secured by a flange at its upper end to a respective side edge portion of frame 34. The lower end of each member 64 carries a guide roller 66 received in a respective one of a pair of curved guide tracks 68 mounted to inner panel structure of quarters 12 and 14 by brackets 70.

In operation, closure 32 is moved from raised to lowered positions by energizing motor 56 in a direction to rotate sector 52 clockwise, whereupon the links 46 and 48 of linkages 38 undergo clockwise rotation about their respective pivots. During such rotation, links 44 are concurrently bodily lowered and rotated counterclockwise in a manner to lower the closure and concurrently reorient it from the generally vertical attitude of FIGURE 1 toward the generally horizontal attitude of FIGURE 2. During initial such movement, the guiding interaction between guide rollers 66 and generally vertical portions 72 of guide tracks 68 restrain closure 32 from any substantial counterclockwise rotation so that the lower edge of the closure will clear the forward edge of deck 16. Subsequently, the guide rollers 66 enter generally horizontal portions of the guide tracks to permit accelerated orientation of the closure toward horizontal and finally, the guide rollers enter rearward generally upwardly inclined portions 74 of guide tracks 68 which are effective to orient the closure 32 into the generally horizontal nested position shown in FIGURE 2. In this position of closure 32, abundant room is made available in well 20 for the reception of folding top 18.

It will be understood that the reverse of the above-described sequence obtains upon operation of motor 56 in a direction rotating sector 52 counterclockwise to move closure 32 from the lowered position to the raised position of FIGURE 1. As guide rollers 66 approach entry into portions 72 of guide tracks 68 during such movement, closure 32 has been located in a position slightly rearwardly and downwardly of that shown in FIGURE 1 and in an attitude wherein it is tilted inwardly away from the fabric portion 28. As guide rollers 66 enter guide track portions 72, the closure moves upwardly but is so restrained as to pivot about guide rollers 66 and to undergo bodily outward movement generally normally of the fabric portion and into tight flush sealing engagement with sealing strip 36.

It will be recognized that if the desired configuration of the sealing strip is other than that of the flush engaging type shown, for example, that of a generally channel-shaped type sealing strip, the guide tracks 68 may accordingly be modified in the area of the portions 72 shown to accomplish the final upward movement of the closure into tight sealing engagement within such a sealing strip.

Thus a new and improved vehicle body window regulator mechanism is provided.

We claim:

1. In a vehicle body having a roof structure provided with a back window opening therein, the combination comprising, a back window closure adapted to close said opening, means adapted to move said closure relative to said body between a raised position adjacent said roof structure and a lowered position within said body, means rotatably mounting said closure on said moving means for rotation relative thereto as said moving means moves said closure between said raised and said lowered positions thereof, guided means mounted on said closure at a point spaced from said mounting means, guiding means mounted on said body and cooperable with said guided means to control rotation of said closure relative to said moving means, and cooperative sealing means on said closure and on said roof structure adjacent said opening, said guiding means including first means cooperable with said guided means in the last stages of movement of said closure toward the lowered position thereof to rotate said closure into a generally horizontal nested attitude and second means cooperable with said guided means in the last stages of movement of said closure toward the raised position thereof to rotate said closure into an attitude effecting tight engagement of said cooperative sealing means and closing said opening.

2. In a vehicle body having a roof structure provided with a back window opening therein, the combination comprising, a back window closure adapted to close said opening, a power driven quadrilateral linkage movable longitudinally of said body and adapted to move said closure relative to said body between a forward raised position adjacent said roof structure and a rearward lowered position within said body, means rotatably mounting said closure on said linkage for rotation relative thereto as said linkage moves said closure between said raised and said lowered positions thereof, an elongated guide member mounted adjacent one end thereof on said closure at a point spaced from said mounting means and having guide roller means mounted adjacent the other end thereof, a guide track mounted on said body and receiving said guide roller means, and cooperative sealing means on said closure and on said roof structure adjacent said opening, said guide track including a first portion cooperable with said guide roller means in the last stages of movement of said closure toward the lowered position thereof to rotate said closure into a generally horizontal nested attitude and a second portion cooperable with said guide roller means in the last stages of movement of said closure toward the raised position thereof to rotate said closure into an attitude effecting tight engagement of said cooperative sealing means and closing said opening.

References Cited

UNITED STATES PATENTS

| 2,299,317 | 10/1942 | Fink | 49—249 |
| 2,582,558 | 1/1952 | Parquette | 49—249 |
| 2,762,648 | 9/1956 | Huzzard | 296—146 X |
| 2,873,612 | 2/1959 | Schneidewind | 49—227 X |
| 3,022,108 | 2/1962 | Cooley | 49—340 X |
| 3,236,557 | 2/1966 | Podolan | 49—249 X |

DAVID J. WILLIAMOWSKY, *Primary Examiner.*

HARRISON R. MOSELEY, *Examiner.*

J. K. BELL, *Assistant Examiner.*